United States Patent [19]

Schach

[11] Patent Number: 5,824,949
[45] Date of Patent: Oct. 20, 1998

[54] TUBULAR SHAPED HOUSING COMPRISING A FLEXIBLE BELT-SHAPED WALL, PARTICULARLY FOR A DISPLAY INSTRUMENT OF A MOTOR VEHICLE

[75] Inventor: Harald Schach, Leonberg, Germany

[73] Assignee: Moto Meter GmbH, Leonberg, Germany

[21] Appl. No.: 669,507
[22] PCT Filed: Oct. 10, 1995
[86] PCT No.: PCT/DE95/01385
  § 371 Date: Jul. 10, 1996
  § 102(e) Date: Jul. 10, 1996
[87] PCT Pub. No.: WO96/15008
  PCT Pub. Date: May 23, 1996

[30] Foreign Application Priority Data

Nov. 10, 1994 [DE] Germany ................. 44 40 148.5

[51] Int. Cl.⁶ .................................................. H05K 5/00
[52] U.S. Cl. .......................................... 174/52.1; 296/70
[58] Field of Search ........................... 296/70, 72; 349/58, 349/1; 220/4.28, 62, 530, 319; 174/52.1, 50; 73/431

[56] References Cited

U.S. PATENT DOCUMENTS 2,379,053 6/1945 Weingart .
2,883,085 4/1959 Rose et al. ............................. 220/664

FOREIGN PATENT DOCUMENTS 91 08 898 9/1991 Germany .

OTHER PUBLICATIONS

Moto Meter–The Complete Program of Automotive Instruments, Shop Devices and Accessories, 3rd Edition—Catalog, pp. 1–40, 1994.

Primary Examiner—Kristine L. Kincaid
Assistant Examiner—Kristina Soderquist
Attorney, Agent, or Firm—Kenyon & Kenyon

[57] ABSTRACT

A tubular-shaped housing comprising a flexible, belt-shaped wall arranged around a display instrument and/or a front pane of the display instrument. The tubular shaped housing is formed by bending the flexible, belt-shaped wall around the display instrument and/or front pane. The belt-shaped wall can be used for differently shaped display instruments and/or front panes, since the flexibility of the belt-shaped wall allows it to adapt to the outer contour of the display instrument and/or of the front pane.

1 Claim, 7 Drawing Sheets

TUBULAR SHAPED HOUSING COMPRISING A FLEXIBLE BELT-SHAPED WALL, PARTICULARLY FOR A DISPLAY INSTRUMENT OF A MOTOR VEHICLE

FIELD OF THE INVENTION

The present invention relates to a tubular-shaped housing comprising a flexible belt-shaped wall.

BACKGROUND INFORMATION

German Patent No. 37 36 761 A1 discloses an instrument cluster for motor vehicles that has various display instruments, indicator panels, controls and warning lights arranged in a shared housing. Its FIG. 2 shows an exploded view of the housing, the housing surrounding the display instruments being comprised of a plurality of rigid plastic objects. Other similarly housed motor vehicle instruments are known from the catalog "Moto Meter-Das komplette Programm an Kfz-Instrumenten, Werkstattgeräten und Zubebör" [Moto Meter-The Complete Program of Automotive Instruments, Shop Devices and Accessories], 3rd edition. Here, as well, it is always a question of inflexible housings, said housings having a rigid, tubular-shaped housing part, which is provided on its front side with a transparent front pane and, on its back side, with a back panel.

SUMMARY OF THE INVENTION

In contrast, an advantage of the tubular housing according to the present invention is that it can be manufactured much less expensively. Moreover, the same belt-shaped wall can be used for differently shaped display instruments and/or front panes, since the flexibility of the belt-shaped wall allows it to adapt to the outer contour of the display instrument and/or of the front pane. Consequently, the belt-shaped wall is also suited for compensating for tolerances in the manufacturing of the display instrument or of the housing panel. Furthermore, the belt-shaped design of the housing makes it possible to produce an endless arrangement of side-by-side housings. As a result, the housing in accordance with the present invention is especially suited for mass production.

By providing at least part of the upper surface area of the flexible, belt-shaped wall with a texture, one is able to advantageously diminish light beam reflection at the surface, thus providing a viewer with greater freedom from surface glare. In addition, a textured housing is easier to manipulate, because it is easier to grip when its surface roughness is increased.

It is advantageous to use a connecting means to join the contiguous edges of the housing arranged around the display instrument and/or the front pane because this prevents the housing from being inadvertently opened again as a result of the belt-shaped wall being bent back. On the other hand, having a connecting means with a releasable design makes it possible to intentionally open the housing e.g., for servicing purposes.

When a joint is used to join the belt-shaped wall to a housing panel, the housing panel can serve as an element for the housing, e.g., as a back panel, an overlay panel, or as a partition, simply by folding it over about the joint.

If the housing panel has openings, then lead-in wires can be run through the openings to elements in the housing, thus facilitating the wiring operation. However, the openings are equally suited for keeping clear the optical path between the display and a viewer, enabling visual observation of the display.

The housing panel advantageously serves the mechanical stability of the ensemble consisting of the display instrument and housing when the display instrument is attachable to the housing panel.

If the housing panel is so joined to the belt-shaped wall that, in the unbent state, both lie in a shared plane, and if the joint enables the housing panel to be folded over about an axis which lies in the shared plane and lies more or less normal to the connecting axis of the joint, then the housing panel is able to be manufactured, e.g., punched out, together with the belt-shaped wall, from a common surface. This arrangement is also able to be advantageously produced as an injection-molded element with an especially flat, easily ejected injection molded shape.

If, on its inner surface, the belt-shaped wall has grooves into which the display instrument and/or the front pane fit at least partially, then the wall, in addition to its property of forming the housing, also serves at the same time to mechanically hold the display instrument and/or the front pane. Other retaining elements are, therefore, unnecessary, so that the arrangement can be produced even more cost-effectively.

If the flexible, belt-shaped wall has a wall-thickness profile that facilitates the bending operation, then the housing can be produced more easily, since high bending forces do not have to be exerted on the belt-shaped wall. Moreover, serviceability is enhanced at the same time, since the belt-shaped wall can be bent back more easily to open the housing.

DETAILED DESCRIPTION

Figure 1:
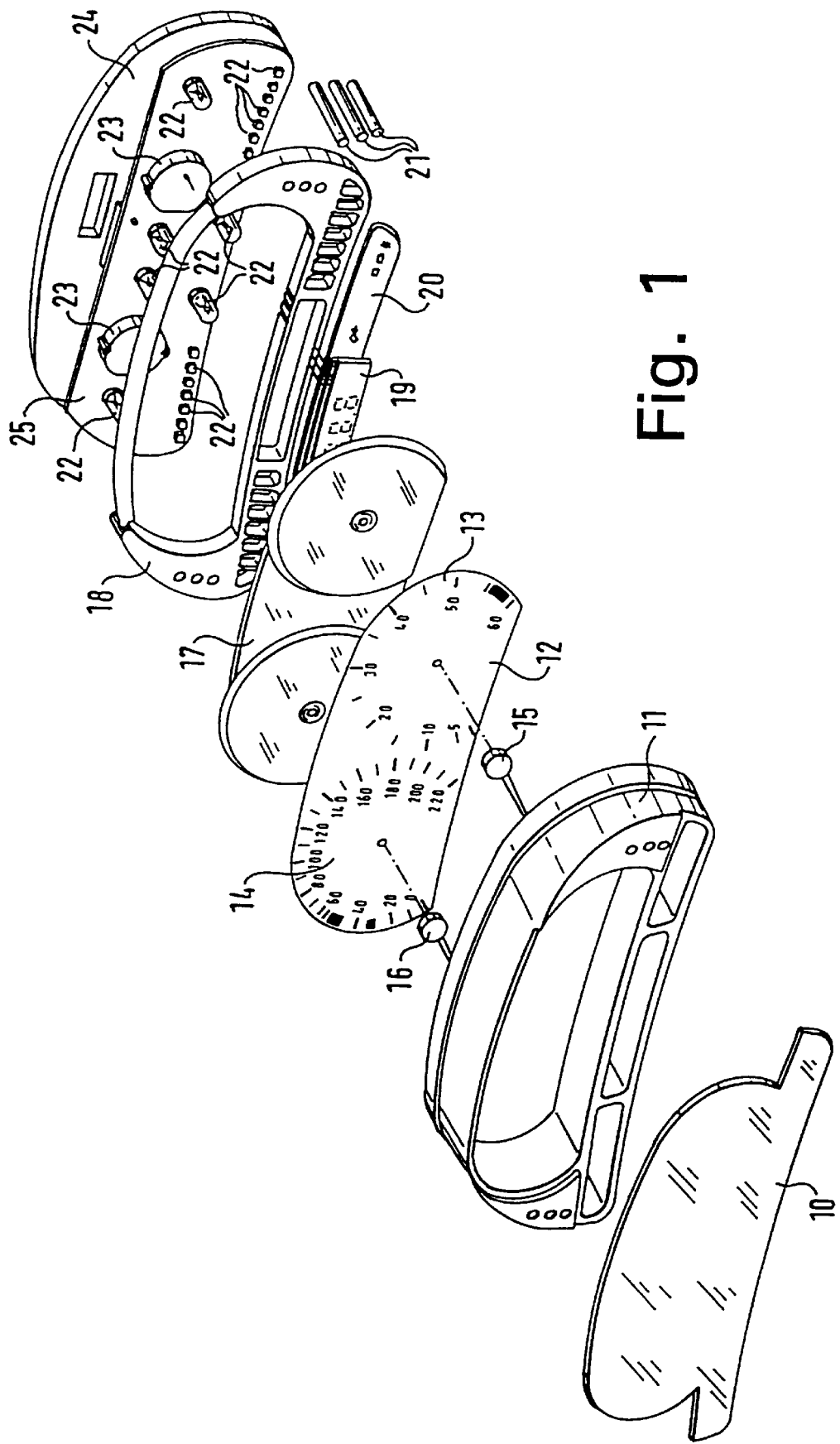
FIG. 1 shows an exploded view of a known instrument cluster.

FIG. 1 shows an exploded view of an instrument cluster as found under the state of the art. Secured to a back panel 24 is a printed-circuit board 25, which supports a plurality of light-emitting means 22, as well as a plurality of pointer driving mechanisms 23, e.g., in the form of stepping motors. Attachable to the front side of the printed-circuit board 25 is a reflector member 18, which has hollow spaces, through which the light from the light-emitting means 22 can radiate through to the front. Moreover, the reflector member 18 has bore holes for adjusting elements 21. A filter panel 20 is arranged in front of the reflector member 18 and partially covers it. The filter panel 20 can have different colorations, as well as different opaque symbols. Arranged in front of the filter panel 20 is an LCD display 19 that only partially covers said filter panel 20. Mounted in front of the reflector member 18 comprising the LCD-display 19 and the filter panel 20, is a light-conducting panel 17. On its front side, the light-conducting panel 17 bears a dial plate 12, on which are arranged a first indicator dial 13 and a second indicator dial 14. In the assembled state, the shafts of the stepping motors 23 pierce through the light-conducting pane 17 and the dial plate 12 and end in the hubs of pointers 15, 16. The pointers 15, 16 are thus rotationally mounted in front of the indicator dials 13, 14. In addition, an instrument mounting frame 11 is provided, which is arranged in front of the dial plate 12 and the pointers 15, 16. The instrument mounting frame 11 has a plurality of tunnel-shaped openings, permitting a viewer to observe the dial plate 12, as well as the filter panel 20. A transparent front pane 10 is mounted on the front side of the instrument mounting frame 11. The elements shown in the representation are put together in the customary manner, so that a compact instrument cluster is formed. The back panel 24, the reflector member 18, as well as the instrument mounting frame 11 together form a tubular housing, which is sealed to the back by the back panel 24. The front side of the tubular housing is covered by the front pane 10. The adjusting elements 21 are suited for controlling other instrument elements not shown in the drawing, such as trip odometers or illuminance-control means.

The back panel 24, the reflector member 18, as well as the instrument mounting frame 11 are manufactured from an injection-molded plastic, which solidifies in its cast shape and thus forms a stable housing wall.

Figure 2A:
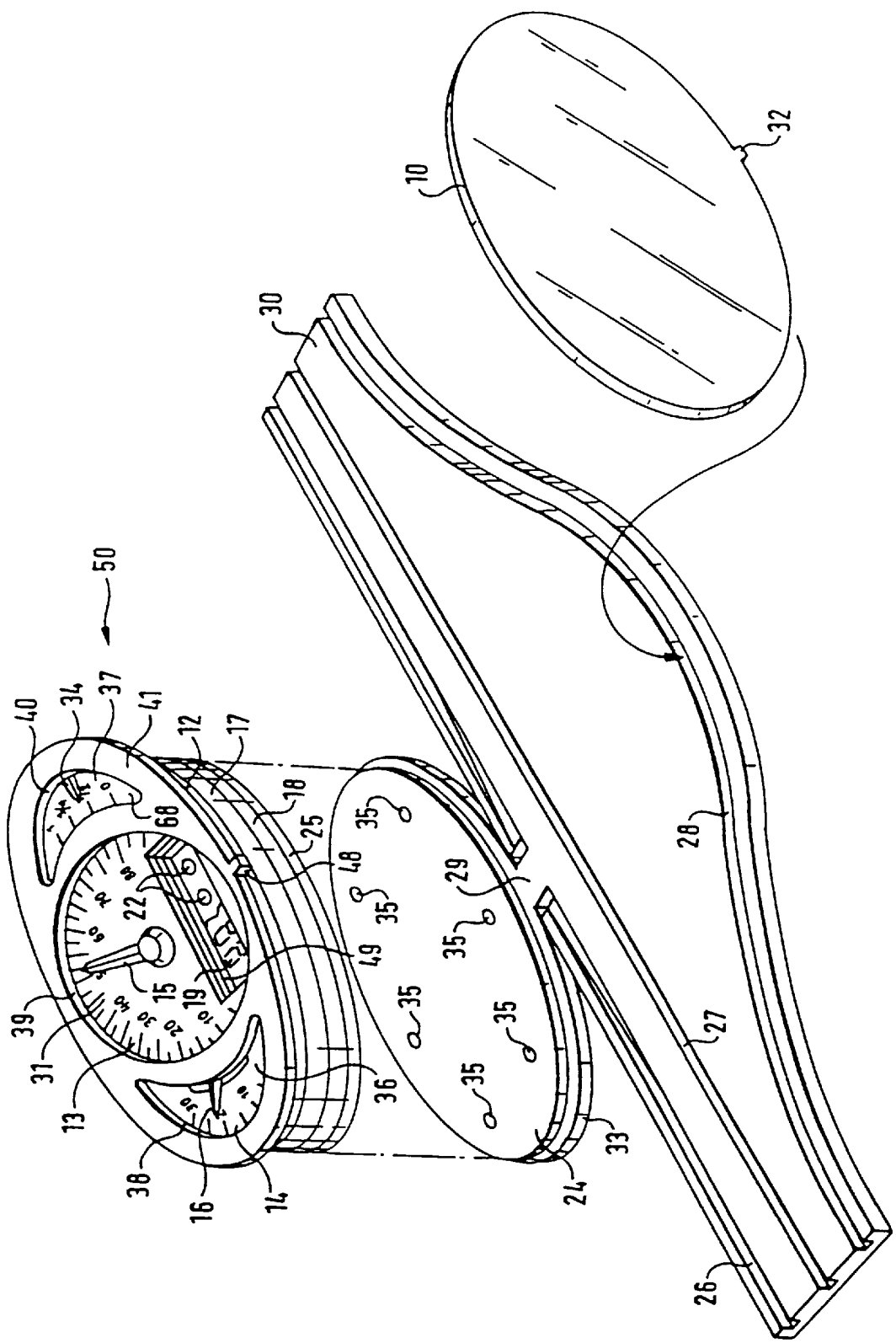
FIG. 2a shows an exploded view of a plurality of display instruments, a front pane, and a belt-shaped wall according to the present invention, with a housing panel serving as a back panel.
Figure 2B:
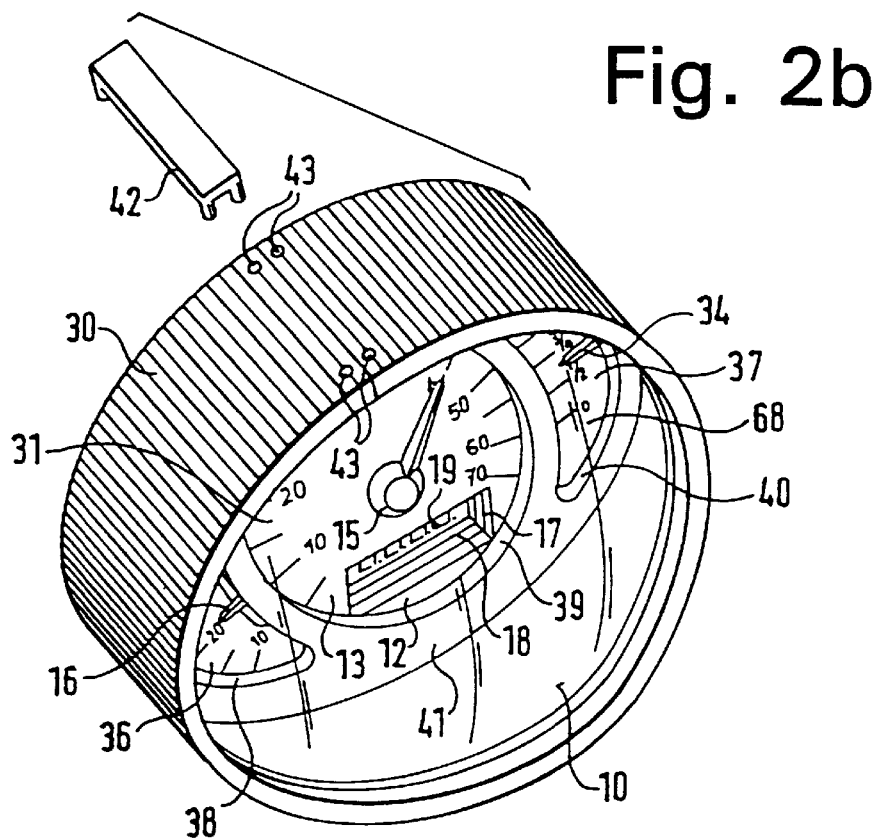
FIG. 2b shows the same arrangement as in FIG. 2a in an assembled state with a connecting means.

A first exemplary embodiment of the tubular housing according to the present invention is shown in FIGS. 2a and 2b. The numbering has been retained for elements corresponding to those of FIG. 1. A flat, elongated, belt-shaped wall 30 is shown, whose rim has a straight, even profile from one end to the other end on one side and, on the opposite side, a curved profile similar to a Gaussian distribution curve. Moreover, the belt-shaped wall 30 has a nearly even top surface. Approximately in the middle of the even profiled rim, two parallel cuts into the belt-shaped wall 30 perpendicular to the direction of the even profiled rim form a flat joint 29, which joins the belt-shaped wall 30 to an approximately oval housing panel 33. The housing panel 33 has a circumferential, step-shaped, upwardly directed offset. In addition, a plurality of holes 35 is arranged in the housing panel 33 on its top side. The belt-shaped wall 30 has a first groove 26, which extends from one end of the belt-shaped wall 30 to the joint 29 and which, continuing on the opposite side of the joint 29, extends further up to the other end of the belt-shaped wall 30, approximately parallel to the even profiled rim of the belt-shaped wall 30. The first groove 26 has a rectangular cross-section. The depth of the first groove 26 gradually increases, starting from the joint 29 toward the two ends of the belt-shaped wall 30 and remains constant from a certain depth on. This depth profile exists on both sides of the joint 29. Provided approximately parallel to the first groove 26 is a second groove 27, which traverses from one end of the belt-shaped wall 30 to the other end and likewise has a rectangular cross-section, but a constant depth. Moreover, a frontal groove 28 with a constant depth and a rectangular cross-section runs more or less parallel to the curved rim of the belt-shaped wall 30. The front pane 10 is insertable into the frontal groove 28. The front pane 10 has an approximately oval design and, on its periphery, has a tenon 32. A cutout (not shown in the drawing) corresponding to the tenon 32 is present in the frontal groove 28. Also provided is a first display instrument 31, which comprises a first pointer 15 over a circular, first indicator dial 13 on a dial plate 12. Moreover, a second display instrument 36 is provided, which comprises a semicircular- shaped, second indicator dial 14 on the dial plate 12 and a second pointer 16. A third display instrument 37 has a linear, third indicator dial 68 on the dial plate 12 and a third pointer 34.

In addition, the dial plate 12 has a rectangular cut-out 49. The dial plate 12 is approximately oval in shape and mounted on a light-conducting pane 17. The light-conducting pane 17, in turn, is secured to a reflector member 18, which is secured to a printed-circuit board 25. Provided on the front side of the dial plate 12 is an overlay panel 41, which has corresponding cut-outs 38, 39, 40 in the areas over the indicator dials 13, 14, 68. Moreover, the overlay panel 41 has a retaining lug 48 on its periphery. The retaining lug 48 corresponds to a hole (not shown in the drawing) in the second groove 27. The rectangular cut-out 49 in the dial plate 12 continues right through the light-conducting panel 17 and the reflector member 18, so that the display surface of a LCD-display 19 is visible. Light-emitting means 22 are mounted on the printed-circuit board 25 behind the LCD display 19.

Together with the overlay panel 41, the light-conducting pane 17, the reflector member 18, and the printed-circuit board 25, the display instruments 31, 36, 37 are initially joined to a display unit 50. The housing panel 33 corresponds in its functioning to the back panel 24 of FIG. 1 for the housing being formed. The housing is formed by placing the display unit 50 on the housing panel 33 and securing it at the holes 35 by means of fixing means and then by bending display unit 50, together with the housing panel 33, about the joint 29 toward the top side of the belt-shaped wall 30 having the grooves 26, 27, 28 and, subsequently, by bending or wrapping the two ends of the belt-shaped wall 30 around the oval outer contour of the display unit 50. The belt-shaped wall 30 is so flexible that the bending can take place with relatively little expenditure of force. In addition, before the two ends are closed, the front pane 10 is inserted into the frontal groove 28 and retained in the closed state by the frontal groove 28 within the belt-shaped wall 30. The retaining lug 48 and the tenon 32 serve as orientation aids so that the front pane 10 and the display unit 50 are inserted in the appropriate angular position. When the belt-shaped wall 30 is bent together, the overlay panel 41 comes to rest in the second groove 27, where the overlay panel 41 is held mechanically in the closed state of the housing. Finally, the first groove 26 wraps partially around the housing panel 33 at its rim, so that a mechanically stable holding takes place here as well. FIG. 2b illustrates the thus created arrangement.

Moreover, at both of its ends on the bottom side, the belt-shaped wall 30 has a plurality of slots 43, into which pins of a sealing element 42 used as a connecting means can be inserted. Thus, the sealing element 42 permanently joins the two ends of the belt-shaped wall 30. The connection is also designed to be re-releasable, so that the housing can be opened for maintenance purposes, to diagnose faults or to install replacement parts. It is equally provided, as an option, for the ends to be joined by means of welding or bonding. By bending the belt-shaped wall 30 around the display unit 50 and the front panel 10, a finished housing is simply formed, so that the configuration created can be used as an instrument cluster, e.g., for a motor vehicle.

Figure 3B:
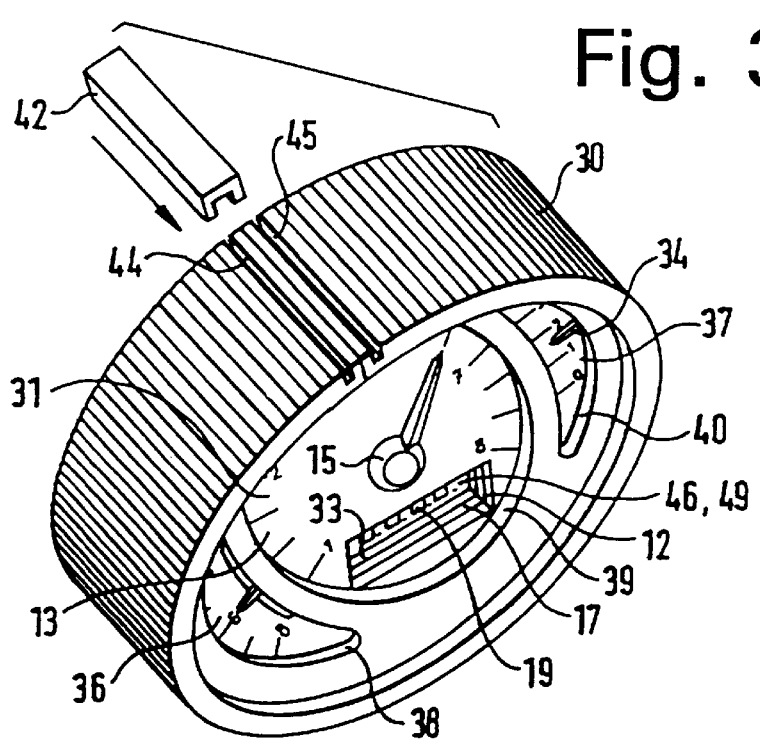
FIG. 3b shows the same arrangement as in FIG. 3a in an assembled state with a connecting means.
Figure 3A:
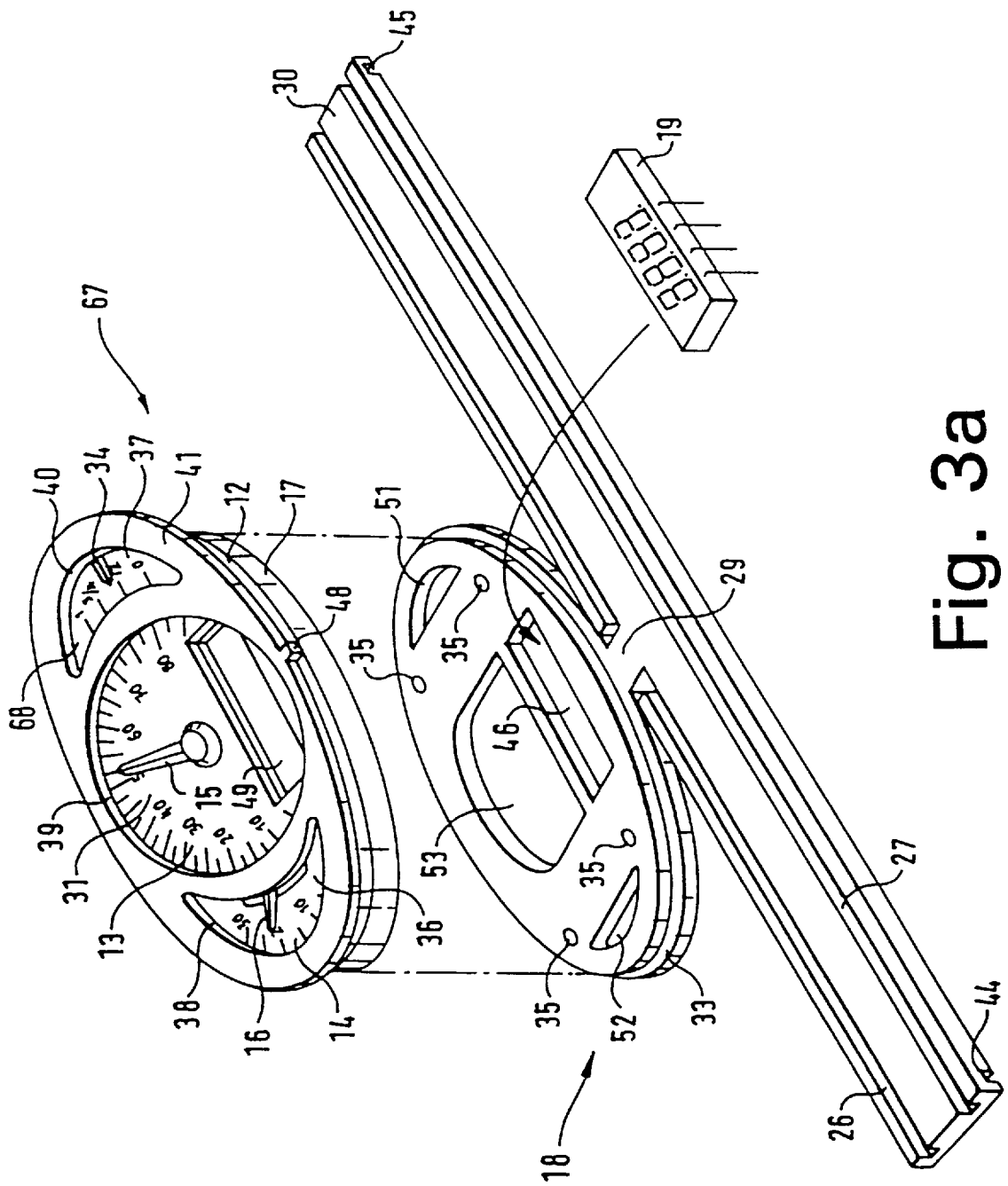
FIG. 3a shows an exploded view of a plurality of display instruments comprising a belt-shaped wall and a housing panel serving as a reflector member according to the present invention.

FIGS. 3a and 3b show another exemplary embodiment of the tubular housing in accordance with the present invention. Here, the same elements have the same numbers as in the preceding Figures. Except for the following differences, the design of the belt-shaped element 30 is identical to that of the belt-shaped element 30 from FIGS. 2a, 2b:

In the case of this belt-shaped wall 30, both rims run as virtually even rims and approximately parallel to one another. Only the first groove 26 and the second groove 27 are provided. The depth profile of both grooves 26, 27 is constant in this case. In addition to the holes 35, the housing panel 33 has a rectangular opening 46, a sliced circular opening 53, and two crescent-shaped openings 51, 52. Moreover, a transverse groove 44, 45 is disposed at each of the two ends of the belt-shaped wall 30 on the side opposing the grooves 26, 27.

Furthermore, the dial plate 12 with the indicator dials 13, 14, 68 is again secured to the light-conducting pane 17, which, together with the pointers 15, 16, 34, make up the display instruments 31, 36, 37. Situated, in turn, on the dial plate 12 is the overlay panel 41 with the three cut-outs 38, 39, 40. The rectangular cut-out 49 is arranged in the dial plate 12, as well as in the light-conducting panel 17. In this case, the housing panel 33 corresponds to the reflector member 18 from FIG. 1, and the openings 51, 52, 53 arranged therein serve as light shafts for the light-emitting means 22 to be mounted behind them.

The configuration comprised of the overlay panel 41, display instruments 31, 36, 37 and the light-conducting panel 17 is represented by a display module 67 and is placed on the housing panel 33 and secured to the holes 35. In so doing, the cut-out 46 is covered by the rectangular cut-out 49, the LCD-display 19 also being introduced between the two cut-outs 46, 49. The housing panel 33 with the display module 67 secured thereto is then folded toward the top side of the belt-shaped wall 30, and the two ends of the belt-shaped wall 30 are wrapped around the outer contour of the display module 67. In this case, the outer contour of the overlay panel 41 fits into the second groove 27. Moreover, the outer contour of the housing panel 33 fits into the first groove 26. Finally, the sealing element 42 is placed on the arrangement, the sealing element 42 having corresponding projections that mate with the transverse grooves 44, 45 and, thus, effect a permanent, but releasable connection of the two ends of the belt-shaped wall 30.

Figure 4A:
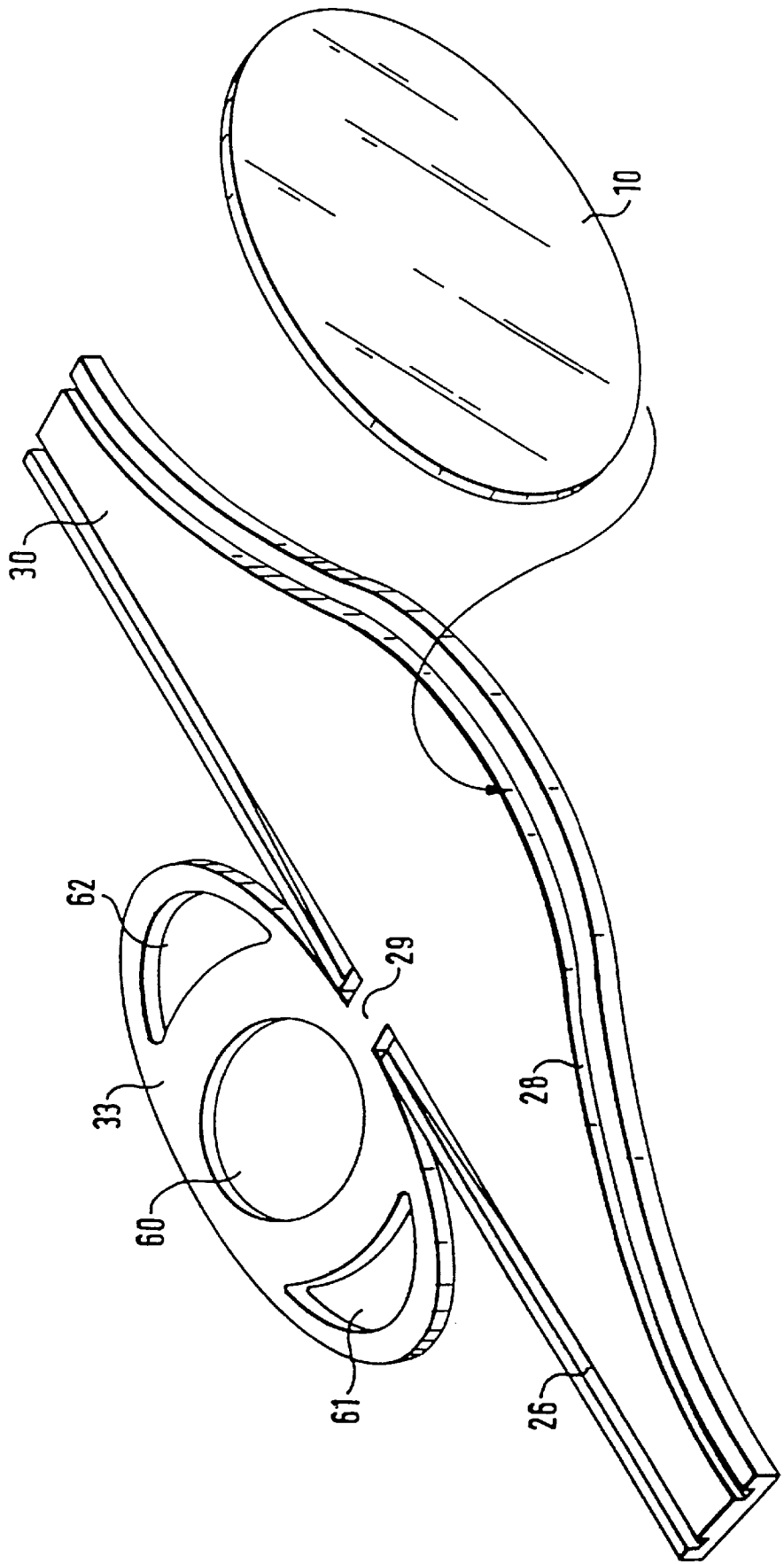
FIG. 4a shows an exploded view of a housing panel according to the present invention serving as an instrument mounting frame, a front panel, and a belt-shaped wall.
Figure 4B:
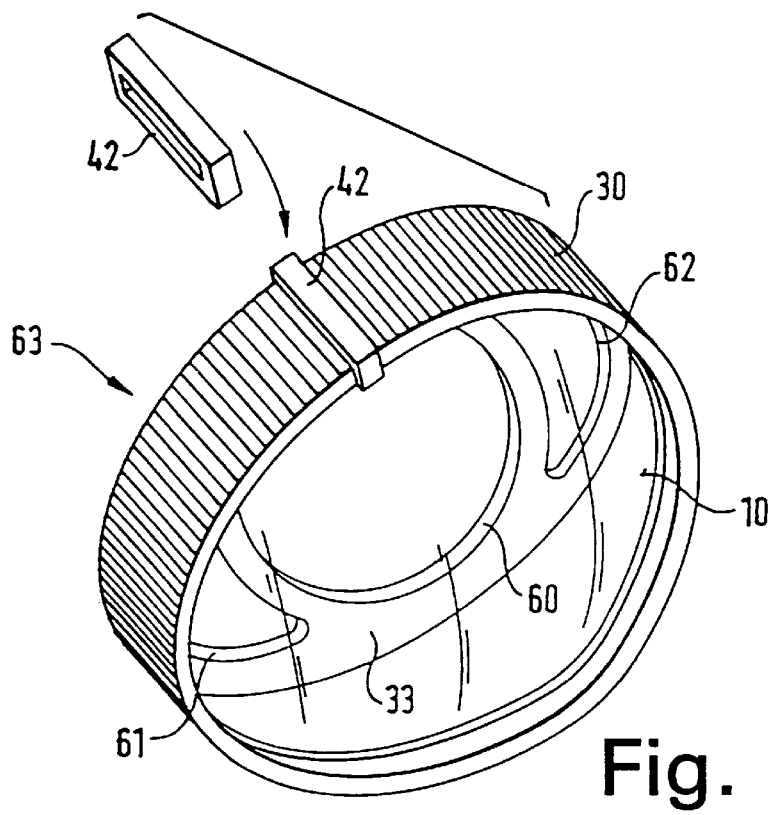
FIG. 4b shows the same arrangement as in FIG. 4a in an assembled state with a connecting means.

A third exemplary embodiment of the housing according to the present invention is shown in FIGS. 4a and 4b. The same elements have the same numbering as in the preceding Figures. The belt-shaped wall 30 has the same shape as the belt-shaped wall 30 in FIG. 2a. However, the second groove 27 has been omitted. Premolded, in turn, on to the joint 29 is the approximately oval housing panel 33. Here, the housing panel 33 has a circular, middle cut-out 60 and, to the left and right of the circular cut-out 60, an approximately crescent-shaped cut-out 61, 62. The front pane 10 is insertable into the frontal groove 28.

The housing is completed by folding the housing panel 33 around the joint 29 toward the top side of the belt-shaped wall 30. After the front pane 10 is inserted into the frontal groove 28, the two ends of the belt-shaped wall 30 are placed around the outer contours of the front pane 10 and of the housing panel 33, until the two ends contact one another. The two ends are subsequently joined by a sealing element 42, which has been shown here by way of example as a square tubular piece. The thus created finished housing 63 can be used in place of the instrument mounting frame 11 of the instrument cluster of FIG. 1.

Figure 5B:
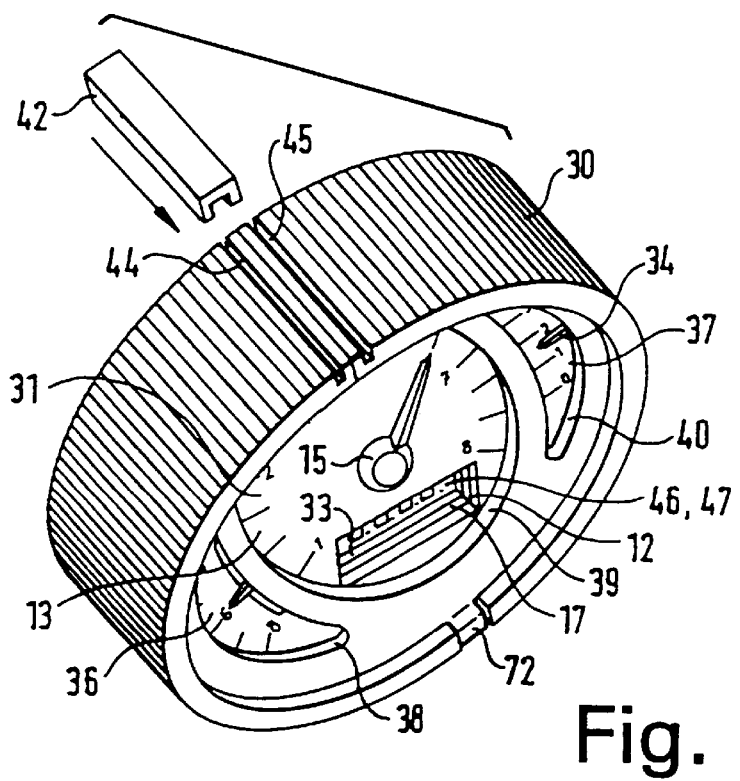
FIG. 5b shows the same arrangement as in FIG. 5a in an assembled state with a connecting means.
Figure 5A:
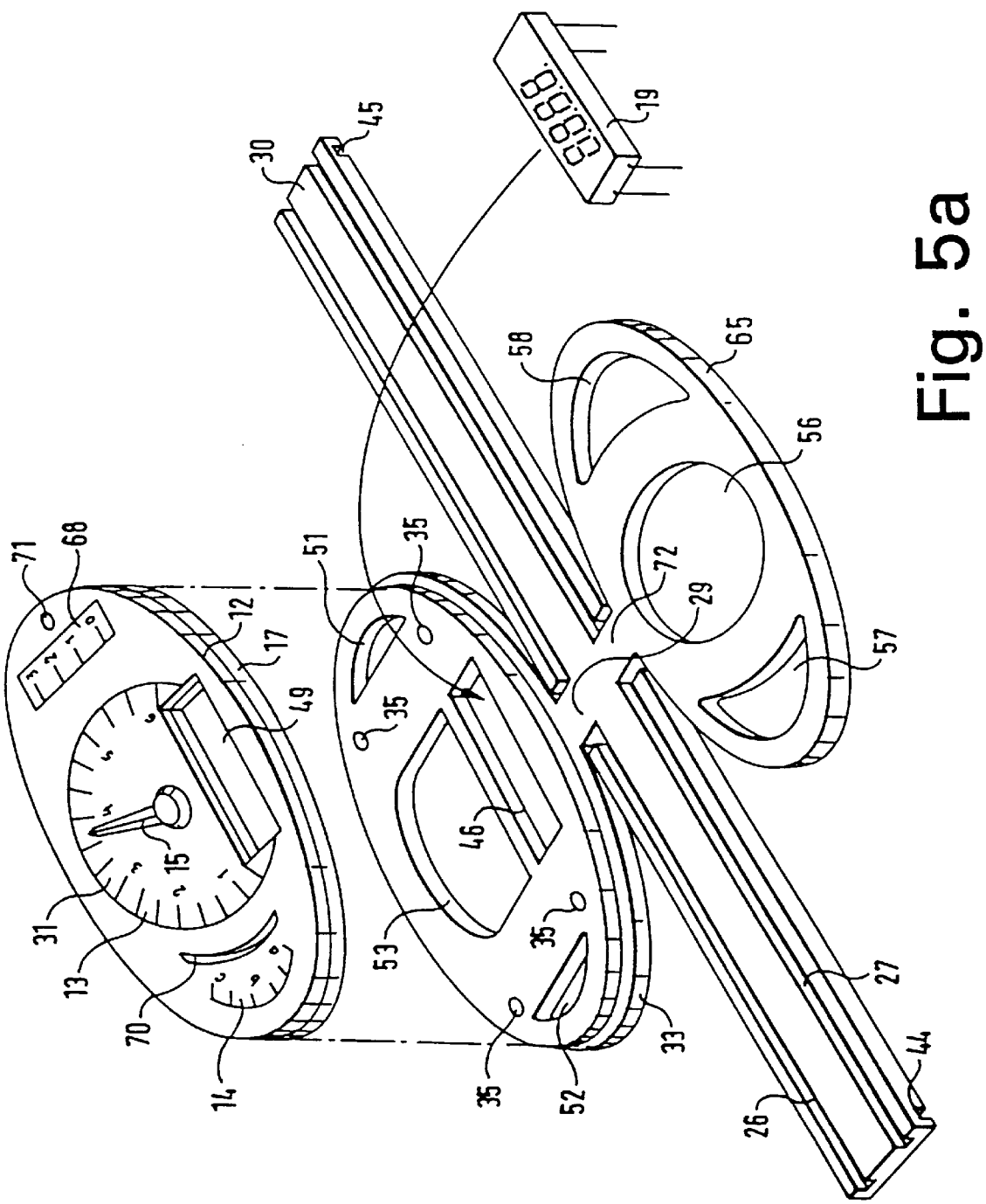
FIG. 5a shows an exploded view of a plurality of display instruments and of a belt-shaped wall, comprising a housing panel serving as a reflector member and a housing panel serving as an instrument mounting frame according to the present invention.

Another practical embodiment of the tubular housing in accordance with the invention is shown in FIGS. 5a and 5b. This is a further development of the housing depicted in FIGS. 3a and 3b, whose numbering was retained. In addition to the elements depicted in FIGS. 3a and 3b, on the side opposite the housing panel 33, the belt-shaped wall 30 has another housing panel 65, which is likewise oval in shape and is joined via another joint 72 to the belt-shaped wall 30. The other housing panel 65 has an approximately circular, middle cut-out 56 and two approximately crescent-shaped cut-outs 57 and 58 situated in each case to the left and right of the circular cut-out 56. Also provided is the dial plate 12, which supports the indicator dials 13, 14, 68 and is arranged on the light-conducting pane 17. Located in the dial plate 12 and in the light-conducting pane 17 is the rectangular cut-out 49, which is arranged in the area of the middle indicator dial 13, as well as a curvilinear cut-out 70, which is arranged on the left indicator dial 49, and a round opening 71 in the area of the right indicator dial 68. The pointer 15 is arranged centrally with respect to the middle indicator dial 13. The other pointers 16, 34, which are to be arranged over the curvilinear cut-out 70 and the round opening 71, are not shown.

The arrangement comprised of the light-conducting pane 17 and the dial plate 12, with the pointers 15, 16, 34, is placed on the housing panel 33 and secured there at the holes 35. The housing panel 33 with the light-conducting pane 17 attached thereto and the dial plate 12 is then folded toward the top side of the belt-shaped wall 30, while the other housing panel 65 is likewise folded at the same time toward the top side of the belt-shaped wall 65. As a result, the additional housing panel 65 arrives in front of the dial plate 12, the additional housing panel 65 with the cut-outs 56, 57, 58, assuming the function of the overlay panel 41 for the dial plate 12 shown in FIGS. 2a, b, etc. The two housing panels 33, 65 are retained in their position by the grooves 26, 27 in the belt-shaped wall 30. Finally, a mechanically fixed connection of the two ends of the belt-shaped wall 30 is achieved, in turn, using the sealing element 42.

Thus, the belt-shaped wall 30 is versatile and can be used as a housing or housing element. Moreover, the present invention provides for a housing for an instrument cluster comprised of a plurality of individual housings with arrangements of the type shown, including a belt-shaped wall 30. Thus, for example, the arrangement of FIG. 4b can be combined with the arrangement of FIG. 3b without the overlay panel 41 and, installed in a housing which includes both arrangements and the remaining components needed to complete the instrument cluster. As a shared housing for the complete arrangement, a housing with a belt-shaped wall 30 can then be used, in turn, to house the modules, each one of which includes a housing with a belt-shaped wall 30.

The surface of the belt-shaped wall 30 may be advantageously roughened on the top side, in order to avoid reflections of light on this surface which could be disturbing to a viewer. On the other hand, the bottom side of the belt-shaped wall 30 may be provided with a structure that improves ease of manipulation, flexibility, and/or suitability for installation. A ribbing or a ribbed wall design can be advantageously specified, the ribs or the ribbing running transversely to the grooves 26, 27, 28, thereby achieving an especially good flexibility. However, other surface textures (rhombus shapes, notches, knobs, perforations, crown patterns, scales, roughening, etc.) can be selected. Moreover, the belt-shaped wall 30 can also be designed as an interlinkage of individual links (mesh structure), which greatly facilitates bending. The flexible, belt-shaped wall 30, together with the housing panel 33 or the housing panels 33, 65 premolded thereon, can be produced piecemeal, e.g., through injection molding, extrusion, or the like. A manufacturing in large piece numbers is also possible, as one can produce and also distribute the individual belt-shaped walls 30 as parts interconnected by removable webs.

The special form designs (crescent-shaped, circular, etc.) have been described purely by way of example. Other form designs can likewise be selected. The displays are not limited to stepping- motor-driven analog displays, but can also include other known types of displays (ELD, LED, digital displays, LCD, DQM, permanent-magnet moving coil elements, moving-iron measuring elements, hot-wire instruments, etc.).

What is claimed is:

1. A tubular shaped housing for at least one display instrument, the at least one display instrument having an outer contour, the housing comprising:

a flexible wall which is wrapped around at least a portion of the outer contour of the at least one display instrument so that the flexible wall conforms to the portion of the outer contour of the at least one display instrument with an inner surface of the flexible wall adapting to discontinuities in the portion of the outer contour of the at least one display instrument; and at least one housing panel movably coupled to the flexible wall; wherein the flexible wall and the housing panel are constructed of a single piece of flexible material so that, when in an unstressed state, the wall and the housing panel lie in a shared plane, and wherein the flexible wall and the housing panel are coupled via a joint such that the housing panel is rotatable relative to the flexible wall about an axis lying in the shared plane.

* * * * *

UNITED STATES PATENT AND TRADEMARK OFFICE
CERTIFICATE OF CORRECTION

PATENT NO. : 5,824,949
DATED : October 20, 1998
INVENTOR(S) : Harald Schach

It is certified that error appears in the above-identified patent and that said Letters Patent is hereby corrected as shown below:

Column 2, line 47, after "invention" insert -- , --;

Column 3, line 46, after "wall 30" insert -- , --;

Column 3, line 47, after "rim" insert -- , --;

Column 6, line 40, "58, assuming" should be --58 assuming--; and

Column 6, line 53, after "and" delete ",".

Signed and Sealed this

Third Day of August, 1999

Attest:

Q. TODD DICKINSON

Attesting Officer   Acting Commissioner of Patents and Trademarks